United States Patent
Hwang et al.

(10) Patent No.: US 11,444,321 B2
(45) Date of Patent: Sep. 13, 2022

(54) TREATING METHOD OF NON-AQUEOUS ELECTROLYTE AND METHOD OF FABRICATING BATTERY

(71) Applicant: National Taiwan University of Science and Technology, Taipei (TW)

(72) Inventors: Bing-Joe Hwang, Taipei (TW); Wei-Nien Su, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 289 days.

(21) Appl. No.: 16/819,207

(22) Filed: Mar. 16, 2020

(65) Prior Publication Data
US 2021/0194051 A1    Jun. 24, 2021

(30) Foreign Application Priority Data

Dec. 19, 2019 (TW) ................. 108146789

(51) Int. Cl.
*H01M 10/0564* (2010.01)
*H01M 10/058* (2010.01)
(Continued)

(52) U.S. Cl.
CPC ..... *H01M 10/0564* (2013.01); *H01M 10/052* (2013.01); *H01M 10/058* (2013.01);
(Continued)

(58) Field of Classification Search
CPC ............... H01M 10/056–0587; H01M 50/609
See application file for complete search history.

(56) References Cited

U.S. PATENT DOCUMENTS 6,514,474 B1    2/2003    Kikuyama et al.
8,247,112 B2    8/2012    Tsunashima et al.
(Continued)

FOREIGN PATENT DOCUMENTS

CN    102481546    5/2012
CN    103427116    12/2013
(Continued)

OTHER PUBLICATIONS

Nithinai Wongittharom, "Electrochemical Performance of LiFePO4 and LiNi0.5Mn1.5O4 in Ionic Liquid Electrolytes for Li Ion Batteries", Dissertation of the graduate program in Department of Chemical and Materials Engineering, National Central University, Jun. 2004, pp. 1-145.
(Continued)

*Primary Examiner* — Jonathan Crepeau
(74) *Attorney, Agent, or Firm* — JCIPRNET (57) ABSTRACT

A treating method of a nonaqueous-electrolyte and a method of fabricating a battery are provided. The treating method is suitable for being performed prior to injecting a nonaqueous-electrolyte into a containing region of the battery. The treating method includes performing at least one first voltage process or at least one second voltage process on the nonaqueous-electrolyte. The first voltage process includes as follows. A first voltage is applied to the nonaqueous-electrolyte. The voltage is adjusted gradually from the first voltage to a second voltage. The voltage is adjusted gradually from the second voltage to the first voltage. The second voltage process includes as follows. A third voltage is applied to the nonaqueous-electrolyte for a predetermined time.

8 Claims, 4 Drawing Sheets

(51) Int. Cl.
*H01M 10/0568* (2010.01)
*H01M 50/609* (2021.01)
*H01M 10/052* (2010.01)

(52) U.S. Cl.
CPC ..... *H01M 10/0568* (2013.01); *H01M 50/609* (2021.01); *H01M 2300/0025* (2013.01)

(56) References Cited

U.S. PATENT DOCUMENTS

| | | |
|---|---|---|
| 9,029,022 B2 | 5/2015 | Miyagi et al. |
| 2010/0216019 A1* | 8/2010 | Morishima ....... H01M 10/0568 429/207 |
| 2012/0141868 A1 | 6/2012 | Hirano |
| 2013/0224606 A1 | 8/2013 | Koh et al. |

FOREIGN PATENT DOCUMENTS

| | | |
|---|---|---|
| CN | 108808144 | 11/2018 |
| CN | 109075392 | 12/2018 |
| JP | 2012-204099 | * 10/2012 |
| TW | 201230441 | 7/2012 |
| TW | 201246655 | 11/2012 |

OTHER PUBLICATIONS

"Office Action of Taiwan Counterpart Application", dated Jul. 3, 2020, p. 1-p. 7.

* cited by examiner

TREATING METHOD OF NON-AQUEOUS ELECTROLYTE AND METHOD OF FABRICATING BATTERY

CROSS-REFERENCE TO RELATED APPLICATION

This application claims the priority benefit of Taiwan application Ser. No. 108146789, filed on Dec. 19, 2019. The entirety of the above-mentioned patent application is hereby incorporated by reference herein and made a part of this specification.

BACKGROUND

Field of the Invention

The invention relates to a treating method of a nonaqueous-electrolyte and a method of fabricating a battery. More particularly, the invention relates to a treating method capable of enhancing an electric capacity and stability of a nonaqueous-electrolyte and a method of fabricating a battery which includes the treating method.

Description of Related Art

Secondary batteries are used as storage batteries of mobile devices (such as notebook personal computers or mobile phones), hybrid cars or electric cars. Among the secondary batteries, secondary lithium (Li) batteries are most widely applied. Along with market demands for the secondary Li batteries with features, such as the capability of being repeatedly charged and discharged, light weight, high voltage value and high energy density, are increased day by day, property requirements for the Li batteries, such as light weight and durability, high voltage, high energy density and high security, are also getting increasingly higher.

During a process of fabricating a Li battery, it is difficult to prevent the occurrence of traces of impure articles, impurities or halide harmful to material characteristics. Generally, the impurities, residual solvent or traces of water are usually removed by rinsing using polar or non-polar solvents together with the use of purification methods, such as adsorption, molecular sieving, vacuum drying and so on. However, processes of the adsorption, rising, removal and vacuum drying are considerably complicated and cause cost rise to practical operations.

Additionally, since a passive film may be formed on an electrode surface of the Li battery during a first charge and discharge process, a part of Li metal is consumed, which causes irreversibility reduction in an overall electric capacity of the Li battery.

SUMMARY

The invention provides a treating method of a nonaqueous-electrolyte, wherein the treated nonaqueous-electrolyte can be provided with a higher electric capacity and stability.

The invention provides a method of fabricating a battery that can fabricate a battery with higher performance and stability.

The invention provides a treating method of a nonaqueous-electrolyte, and the treating method is suitable for being performed prior to injecting the nonaqueous-electrolyte into a containing region of a battery. The treating method includes performing at least one first voltage process or at least one second voltage process on the nonaqueous-electrolyte. The first voltage process includes the following steps. First, a first voltage is applied to the nonaqueous-electrolyte. Thereafter, the voltage is adjusted gradually from the first voltage to a second voltage. Then, the voltage is adjusted gradually from the second voltage to the first voltage. The second voltage process includes applying a third voltage to the nonaqueous-electrolyte for a predetermined time.

In the treating method of the nonaqueous-electrolyte according to the embodiments of the invention, the nonaqueous-electrolyte includes a fluorine-containing electrolyte and an organic solvent.

In the treating method of the nonaqueous-electrolyte according to the embodiments of the invention, the first voltage process includes the following steps. First, the first voltage is applied to the nonaqueous-electrolyte. Thereafter, the voltage is increased gradually from the first voltage to the second voltage. Then, the voltage is reduced gradually from the second voltage to the first voltage. The first voltage is 0 V, and the second voltage is 3 V.

In the treating method of the nonaqueous-electrolyte according to the embodiments of the invention, the first voltage process includes the following steps. First, the first voltage is applied to the nonaqueous-electrolyte. Thereafter, the voltage is reduced gradually from the first voltage to the second voltage. Then, the voltage is increased gradually from the second voltage to the first voltage. The first voltage is 3 V, and the second voltage is 0 V.

In the method of fabricating the battery according to the embodiments of the invention, the third voltage ranges, for example, from 0.5 V to 3.0 V, and the predetermined time ranges, for example, from 5 minutes to 300 minutes.

The invention provides a method of fabricating a battery, and the fabricating method includes the following steps. First, at least one first voltage process or at least one second voltage process is performed on a nonaqueous-electrolyte. Then, the treated nonaqueous-electrolyte is injected a containing region of the battery. The first voltage process includes the following steps. First, a first voltage is applied to the nonaqueous-electrolyte. Thereafter, the voltage is adjusted gradually from the first voltage to a second voltage. Then, the voltage is adjusted gradually from the second voltage to the first voltage. The second voltage process includes applying a third voltage to the nonaqueous-electrolyte for a predetermined time.

In the method of fabricating the battery according to the embodiments of the invention, the nonaqueous-electrolyte includes a fluorine-containing electrolyte and an organic solvent.

In the method of fabricating the battery according to the embodiments of the invention, the first voltage process includes the following steps. First, the first voltage is applied to the nonaqueous-electrolyte. Thereafter, the voltage is increased gradually from the first voltage to the second voltage. Then, the voltage is reduced gradually from the second voltage to the first voltage. The first voltage is 0 V, and the second voltage is 3 V.

In the method of fabricating the battery according to the embodiments of the invention, the first voltage process includes the following steps. First, the first voltage is applied to the nonaqueous-electrolyte. Thereafter, the voltage is reduced gradually from the first voltage to the second voltage. Then, the voltage is increased gradually from the second voltage to the first voltage. The first voltage is 3 V, and the second voltage is 0 V.

In the method of fabricating the battery according to the embodiments of the invention, the third voltage ranges, for example, from 0.5 V to 3.0 V, and the predetermined time ranges, for example, from 5 minutes to 300 minutes.

To sum up, in the invention, prior to injecting the non-aqueous-electrolyte into the containing region of the battery, at least one voltage process is performed on the nonaqueous-electrolyte. After the voltage process is performed on the nonaqueous-electrolyte, impurities can be removed from the nonaqueous-electrolyte. Thereby, the electrochemical performance of the nonaqueous-electrolyte can be enhanced, and the stability of the nonaqueous-electrolyte can also be improved, so as to increase the performance of the battery.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
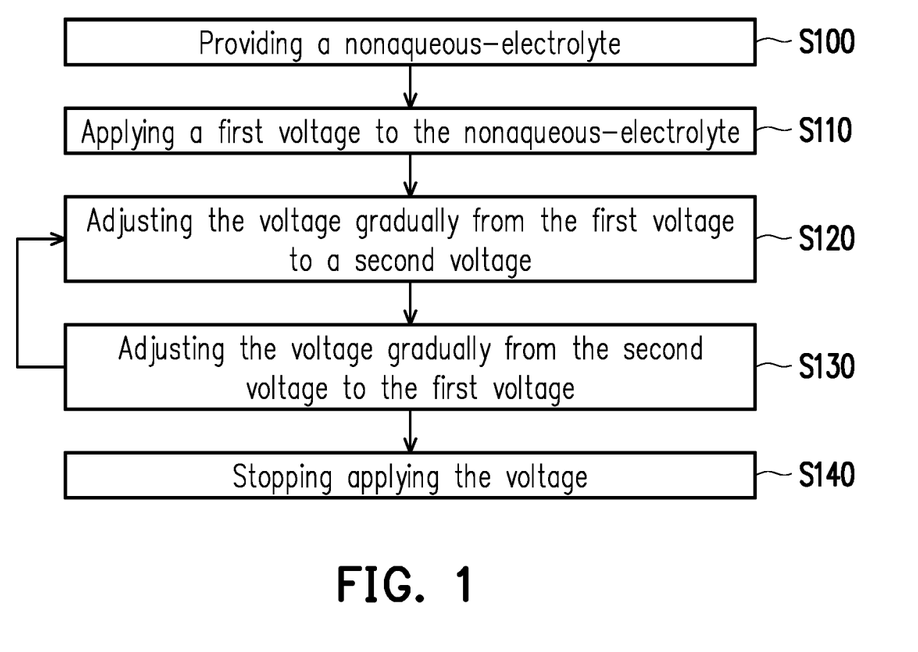
FIG. 1 is a flowchart illustrating a treating process of a nonaqueous-electrolyte according to an embodiment of the invention.

FIG. 1 is a flowchart illustrating a treating process of a nonaqueous-electrolyte according to an embodiment of the invention. Referring to FIG. 1, step S100 is first performed, where a nonaqueous-electrolyte is provided. The nonaqueous-electrolyte includes a fluorine-containing electrolyte and an organic solvent. A concentration of the fluorine-containing electrolyte is, for example, from 0.1 M to 5 M. The fluorine-containing electrolyte includes, for example, $LiPF_6$, $LiBF_4$, $LiSO_3CF_3$, $LiN(SO_2CF_3)_2$, $LiN(SO_2CF_2CF_3)_2$, LiTFSI, $LiAsF_6$, $LiSbF_6$, $LiC(SO_2CF_3)_3$, $LiO_3SCF_2CF_3$, $LiC_6F_5SO_3$, $LiO_2CCF_3$, $LiSO_3F$ or a combination thereof. The organic solvent includes, for example, a carbonate solvent, an ester solvent, an ether solvent, a ketone solvent or a combination thereof.

In an embodiment, a carbonate solvent with preferable electrochemical stability, a high dielectric constant, non-toxicity and a proper dissociation ability may be served as the organic solvent for dissolving the fluorine-containing electrolyte. The carbonate solvent includes, for example, a cyclic carbonate solvent, a chain carbonate solvent or a combination thereof. The cyclic carbonate solvent includes, for example, ethylene carbonate (EC), propylene carbonate (PC) or a combination thereof. The chain carbonate solvent includes, for example, dimethyl carbonate (DMC), diethyl carbonate (DEC), ethylmethyl carbonate (EMC) or a combination thereof.

Additionally, in another embodiment, the nonaqueous-electrolyte may further include an additive, wherein based on 100 wt % of the nonaqueous-electrolyte, a content of the additive is from 0 wt % to 5 wt %, or alternatively, based on 100 vol % of the nonaqueous-electrolyte, the content of the additive is from 0 Vol % to 5 vol %. The additive includes LiBOB (lithium bis(oxalate)borate), STOBA (maleimide-based additive), FEC (fluroethylene carbonate), VEC (Vinylethylene carbonate), VC (Vinylene carbonate), ES (ethylene sulfite), VES (Vinylethylene sulfite) or the like.

In an embodiment, a method of preparing the nonaqueous-electrolyte includes, for example, adding the fluorine-containing electrolyte and the additive (if needed) into one of the aforementioned organic solvents to obtain the nonaqueous-electrolyte after uniform mixing, but the invention is not limited thereto. In another embodiment, a variety of organic solvents may be first mixed into a mixture at a specific weight ratio. Then, the fluorine-containing electrolyte and the additive (if needed) may be added into the mixture to obtain the nonaqueous-electrolyte after uniform mixing.

Thereafter, at least one first voltage process is performed on the nonaqueous-electrolyte. In the present embodiment, the first voltage process is performed on the nonaqueous-electrolyte in a voltage interval from 0 V to 3 V, for example, but the invention is not limited thereto. In other embodiments, the voltage interval of the voltage process may be adjusted according to actual demands. Specifically, the first voltage process includes the following steps. First, step S110 is performed, where a first voltage is applied to the nonaqueous-electrolyte. In an embodiment, the first voltage is, for example, 0 V. Thereafter, step S120 is performed, where the voltage is slowly adjusted, such that the voltage is adjusted gradually from the first voltage to a second voltage. In the present embodiment, the second voltage is, for example, 3 V. Then, step S130 is performed, where the voltage is slowly adjusted, such that the voltage is adjusted gradually from the second voltage back to the first voltage, but the invention is not limited thereto. In another embodiment, the first voltage is, for example, 3 V. Thereafter, step S120 is performed, where the voltage is slowly adjusted, such that the voltage is adjusted gradually from the first voltage to the second voltage. In the present embodiment, the second voltage is, for example, 0 V. Then, step S130 is performed, wherein the voltage is slowly adjusted, such that the voltage is adjusted gradually from the second voltage back to the first voltage. Afterwards, step S140 is performed, where the voltage is stopped from being applied to the nonaqueous-electrolyte.

It is to be mentioned that a speed rate of increasing the voltage from the first voltage to the second voltage or a speed rate of reducing the voltage from the second voltage to the first voltage is not limited in the invention. This is because during the voltage process, the nonaqueous-electrolyte may not be adequately treated if the speed rate of increasing (or reducing) the voltage is too fast; otherwise, a treating time may be increased, or an issue of a high temperature of the nonaqueous-electrolyte may arise from a long treating time of the nonaqueous-electrolyte if the speed rate of increasing (or reducing) the voltage is too slow. Thus, the speed rate of increasing (or reducing) the voltage may be adjusted according to an actual demand.

In another embodiment, at least one second voltage process is performed on the nonaqueous-electrolyte. The second voltage process includes, for example, applying a third voltage to the nonaqueous-electrolyte for a predetermined time. The third voltage ranges, for example, from 0.5 V to 3.0 V. The predetermined time ranges, for example, from 5 minutes to 300 minutes.

In the present embodiment, since the applied voltage is adjusted gradually during the process of performing the first voltage process on the nonaqueous-electrolyte, or alternatively, a constant voltage is applied to the nonaqueous-electrolyte during the process of performing the second voltage process on the nonaqueous-electrolyte, impurities or impure articles are removed from the nonaqueous-electrolyte in this way, which may facilitate enhancing stability of the nonaqueous-electrolyte and also increasing an electric capacity of the nonaqueous-electrolyte.

It is specially to be mentioned that in the embodiment described above, the first voltage process is only performed on the nonaqueous-electrolyte once, but the invention is not limited thereto. In another embodiment, the first voltage process may be performed on the nonaqueous-electrolyte twice or more times. Specifically, to perform the voltage process on the nonaqueous-electrolyte twice or more times, step S120 and step S130 may be repeatedly performed after step S130 is performed, and step S140 is then performed. In the same way, the second voltage process may be performed on the nonaqueous-electrolyte twice or more times. In different second voltage processes, the third voltages and the predetermined times may respectively be the same or different. In the embodiment described above, as the number of times of performing the voltage process on the nonaqueous-electrolyte is increased, the impurities or impure articles may be further removed from the nonaqueous-electrolyte, which further facilitates enhancing the stability of the nonaqueous-electrolyte and increasing the electric capacity of the nonaqueous-electrolyte.

Figure 2:
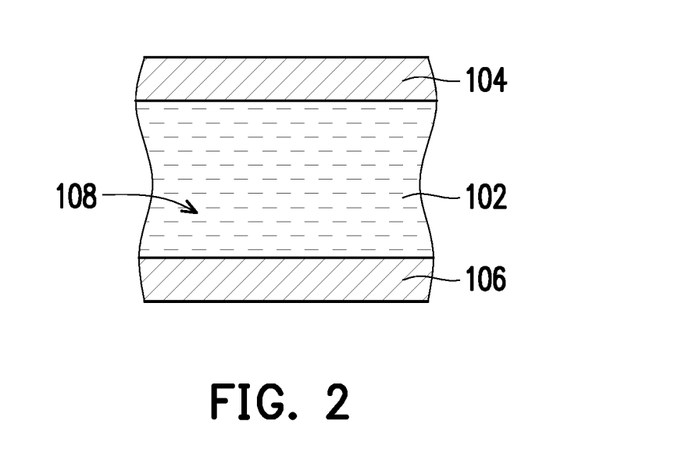
FIG. 2 is a schematic diagram illustrating a battery according to an embodiment of the invention.

After the nonaqueous-electrolyte is treated by the voltage process, the treated nonaqueous-electrolyte may be further used in different subsequent applications. For instance, the nonaqueous-electrolyte treated by the voltage processes of the invention may be injected into a batter, and a subsequent battery packaging process may be performed. Referring to FIG. 2, a nonaqueous-electrolyte 102 treated by the voltage process of the invention may be injected into a containing region 108 between an anode 104 and a cathode 106. In the present embodiment, as the nonaqueous-electrolyte of the invention is treated by performing the voltage process prior to being injected into the containing region of the battery, not only the impurities and impure articles may be removed from the nonaqueous-electrolyte, but also the issue of irreversibility reduction in the electric capacity of the battery due to a first charge and discharge process may be effectively improved. Thus, the battery containing the nonaqueous-electrolyte may have preferable performance and stability.

In order to evidence that the treating method applied in the nonaqueous-electrolyte of the embodiments of the invention has effects of improving the stability of the nonaqueous-electrolyte and increasing the electric capacity, experimental examples are provided below for describe characteristics thereof. Data results of the experimental examples below are used only for describing the characteristics (such as the electric capacity and stability) of the nonaqueous-electrolyte of the embodiments of the invention, but are not intended to limit scope of the invention.

Experimental Example 1

First, $LiPF_6$ was dissolved in an EC/DEC organic solvent (at a volume ratio of EC:DEC=1:1), and thereby, a nonaqueous-electrolyte in which a concentration of $LiPF_6$ was 1 M was prepared. Thereafter, a voltage process was repeatedly performed on the nonaqueous-electrolyte 80 times. One time of the voltage process was defined as first applying a voltage of 0.0 V to the nonaqueous-electrolyte, gradually increasing the voltage to 1.4 V at a speed rate of 10 mV/s and then, gradually reducing the voltage back to 0.0 V.

Experimental Example 2

In Experimental example 2, a nonaqueous-electrolyte was prepared by the same steps of Experimental example 1. However, the difference lies in that in Experimental example 2, the voltage process was repeatedly performed on the nonaqueous-electrolyte 50 times.

Comparative Example 1

In Comparative Example, a nonaqueous-electrolyte was prepared by the same steps of Experimental example 1. However, the difference lies in that in Comparative Example, no voltage process was performed on the nonaqueous-electrolyte.

Capacity-Voltage Test

A C-V (electric capacity-voltage) curve was used to describe a relation between a voltage and an electric capacity during the process that the nonaqueous-electrolyte was charged and discharged. In a charge/discharge cycle, the nonaqueous-electrolyte was charged and discharged respectively at a speed rate of 0.1 C (a C-rate refers to a charge/discharge speed rate) to measure the electric capacity. A charge/discharge cycle was defined as first charging the nonaqueous-electrolyte to 3 V by a fixed current and then, discharging the nonaqueous-electrolyte to a turn-off voltage (0.01 V) by the fixed current. The electric capacities (milliamp hours per gram, mAh/g) of the nonaqueous-electrolytes of Experimental example 1 and Comparative Example 1 are as shown in FIG. 3.

Figure 3:
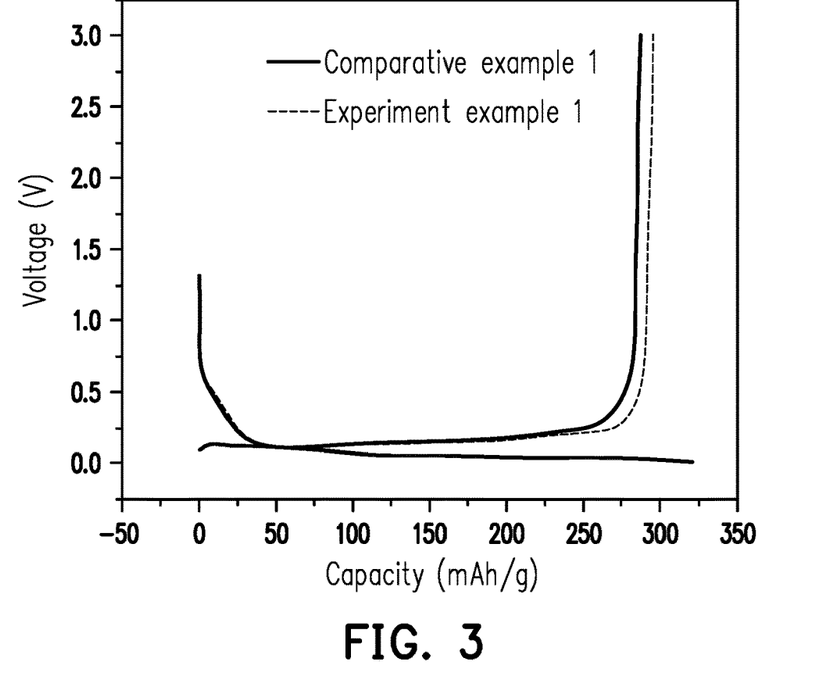
FIG. 3 is a C-V (capacity-voltage) graph of nonaqueous-electrolytes of Experimental example 1 and Comparative Example 1.

Referring to FIG. 3, comparing Experimental example 1 of the invention with Comparative Example 1, the electric capacity of the nonaqueous-electrolyte of Experimental example 1 was obviously higher than the electric capacity of Comparative Example 1. According to the above results, regarding the nonaqueous-electrolyte of the invention, the electric capacity of the nonaqueous-electrolyte after being treated by the voltage process may be increased.

Stability Test

Experimental Example 3

A voltage scanning operation was performed on a Li/MCMB (meso carbon micro beads) battery containing the nonaqueous-electrolyte of Experimental example 2 at a scanning rate of 0.1 mV/s, a voltage range scanned thereby was from 0.01V to 3V, and a current was generated in the occurrence of an oxidation or reduction reaction during a voltage-level change period, thereby obtaining a current-to-voltage level relation.

Comparative Example 2

In Comparative Example 2, the same steps of Experimental example 3 was performed. However, the difference lies in that the Li/MCMB battery in Comparative Example 2 contained the nonaqueous-electrolyte of Comparative Example 1.

Figure 4:
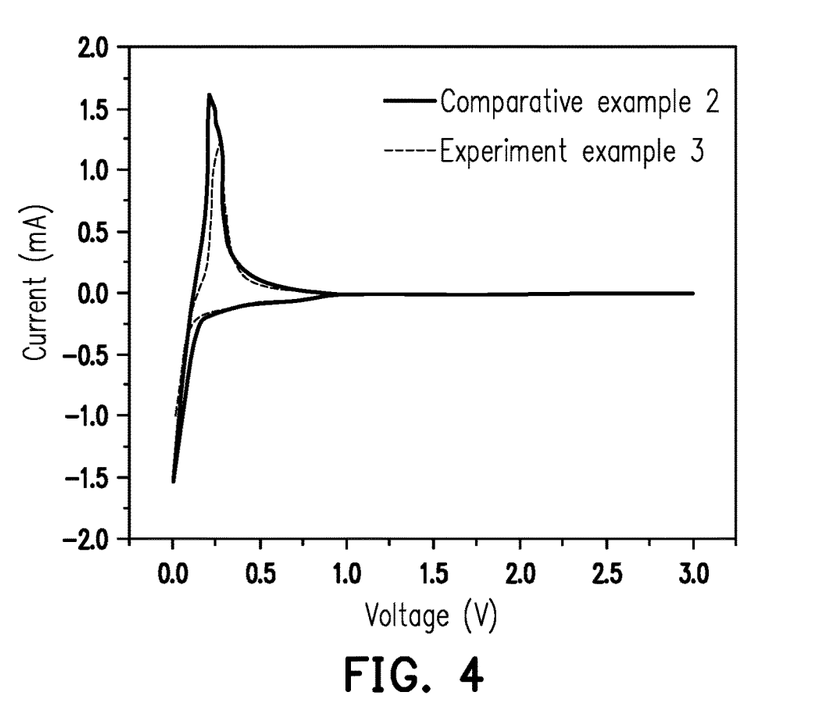
FIG. 4 is a current-to-voltage level relation graph for Experimental example 3 and Comparative Example 2.

FIG. 4 is a current-to-voltage level relation graph for Li/MCMB batteries of Experimental example 3 and Comparative Example 2. When the scanning operation was performed from a low voltage to a high voltage, it was found that there was a reaction peak near about 0.75 V in Comparative Example 2. In other words, when a voltage was 0.75 V, the oxidation or reduction reaction occurred to the nonaqueous-electrolyte of Comparative Example 2. However, the oxidation or reduction reaction occurred to the nonaqueous-electrolyte of Experimental example 3 only in a scenario of a higher voltage. Namely, stability of the nonaqueous-electrolyte of Experimental example 3 was higher than the stability of that of Comparative Example 2. According to the above results, regarding the nonaqueous-electrolyte of the invention, the stability of the nonaqueous-electrolyte after being treated by the voltage process may be enhanced.

Experimental Example 4

First, $LiPF_6$ was dissolved in an EC/DEC organic solvent (at a volume ratio of EC:DEC=1:1) and additionally added with 0.2 vol % of water, thereby obtaining a nonaqueous-electrolyte containing 0.2 vol % of water. Thereafter, a voltage of 0.6 V was applied to the nonaqueous-electrolyte for a period of time.

Experimental Example 5

In Experimental example 5, a nonaqueous-electrolyte was prepared by the same steps of Experimental example 4. However, the difference lies in that in Experimental example 5, a voltage of 0.8V was applied to the nonaqueous-electrolyte.

Experimental Example 6

In Experimental example 6, a nonaqueous-electrolyte was prepared by the same steps of Experimental example 4. However, the difference lies in that in Experimental example 6, a voltage of 1 V was applied to the nonaqueous-electrolyte.

Experimental Example 7

In Experimental example 7, a nonaqueous-electrolyte was prepared by the same steps of Experimental example 4. However, the difference lies in that in Experimental example 7, a voltage of 1.2 V was applied to the nonaqueous-electrolyte.

Figure 5:
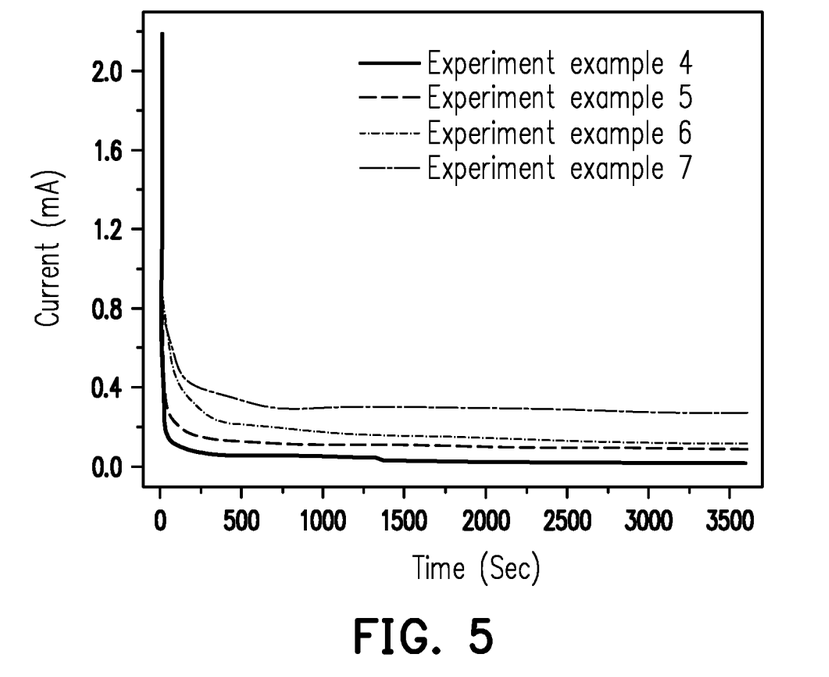
FIG. 5 illustrates chronoamperometry (CA) test results of Experimental example 4 through Experimental example 7.

A chronoamperometry (CA) method may be used to check voltage differences caused due to the reduction in water volumes in the electrolyte after different voltages are applied. FIG. 5 shows CA test results of Experimental example 4 through Experimental example 7. According to FIG. 5, the current is increased as the applied voltage is increased. The results mean that as the voltage is increased, more reactions may likely occur.

After the CA measurement, the water contents in the nonaqueous-electrolytes of Experimental example 4 through Experimental example 7 was measured by a Karl Fischer titration, and results thereof are as shown in Table 1 below. In the present embodiment, a nonaqueous-electrolyte containing 0.2 vol % of water and not treated by any voltage process was served as Control group 1. According to the contents of Table 1, a water content of the nonaqueous-electrolyte of Control group 1 was 1696.65 ppm. However, contents of water in all the electrolytes which were treated by the voltage process are reduced. According to the contents set forth above, the water content in the nonaqueous-electrolyte of the invention may be reduced after the nonaqueous-electrolyte is treated by the voltage process.

TABLE 1

| | Voltage (V) | Water volume (ppm) | Charge (A · s) | Time (Hour) |
|---|---|---|---|---|
| Control group 1 | — | 1696.65 | — | — |
| Experimental example 4 | 0.6 | 1561.25 | 0.036432 | 1 |
| Experimental example 5 | 0.8 | 1488.55 | 0.131688 | 1 |
| Experimental example 6 | 1 | 1512.25 | 0.179413 | 1 |
| Experimental example 7 | 1.2 | 1579.6 | 0.382901 | 1 |

Experimental Example 8

First, $LiPF_6$ was dissolved in an EC/DEC organic solvent (at a volume ratio of EC:DEC=1:1) and additionally added with 0.04 vol % of water, thereby obtaining a nonaqueous-electrolyte containing 0.04 vol % of water. Thereafter, a voltage of 0.8 V was applied to the nonaqueous-electrolyte for 48 hours.

Experimental Example 9

In Experimental example 9, a nonaqueous-electrolyte was prepared by the same steps of Experimental example 8. However, the difference lies in that in Experimental example 9, the voltage was applied to the nonaqueous-electrolyte for 96 hours.

Comparative Example 3

In Comparative Example 3, a nonaqueous-electrolyte was prepared by the same steps of Experimental example 8. However, the difference lies in that in Comparative Example 3, the nonaqueous-electrolyte was not treated by any voltage process.

Water contents in the nonaqueous-electrolytes of Experimental example 8, Experimental example 9 and Comparative Example 3 was measured by the Karl Fischer titration, and results thereof are as shown in Table 2. In the present embodiment, a nonaqueous-electrolyte not containing additional water was served as Control group 2. According to the contents of Table 2, a water content of the nonaqueous-electrolyte of the invention after being treated by the voltage process at a voltage of 0.8V may be reduced, and the water volume is reduced as the time of the voltage process is increased.

TABLE 2

| | Voltage (V) | Water volume (ppm) | Charge (A · s) | Time (Hour) |
|---|---|---|---|---|
| Control group 2 | — | 5.0 | — | — |
| Comparative Example 3 | — | 432.05 | — | — |
| Experimental example 8 | 0.8 | 339.1 | 49.7 | 48 |
| Experimental example 9 | 0.8 | 51.8 | 51.4 | 96 |

Figure 6:
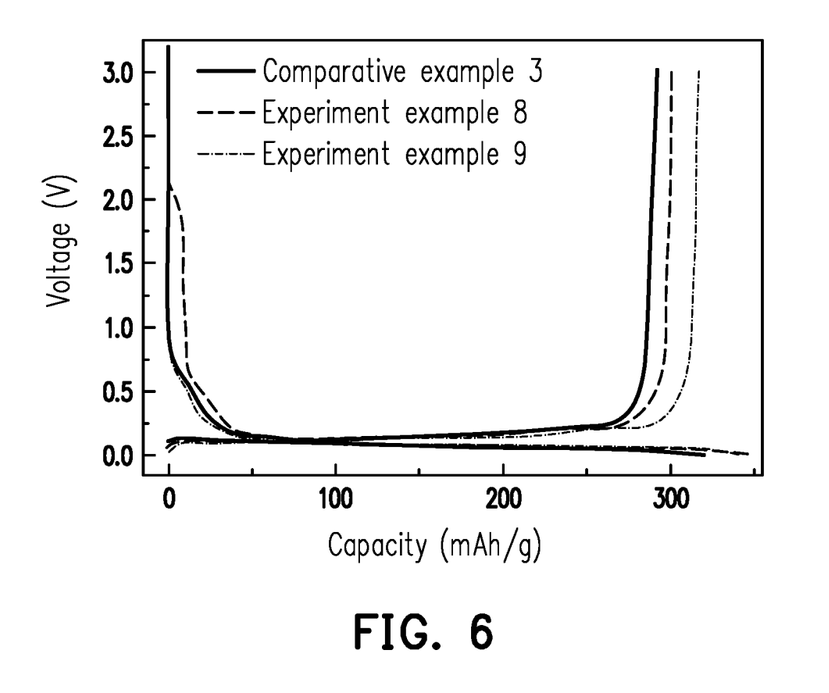
FIG. 6 is a C-V graph of nonaqueous-electrolytes of Experimental example 8, Experimental example 9 and Comparative Example 3.
Figure 7:
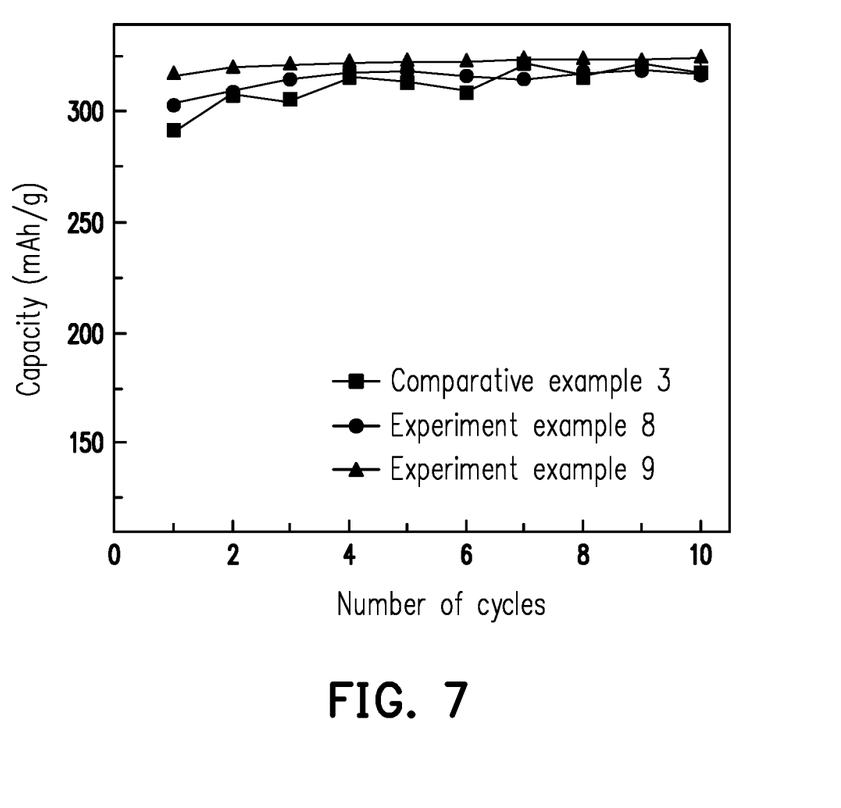
FIG. 7 shows cycle performance of Li (lithium)/MCMB (meso carbon micro beads) batteries of Experimental example 8, Experimental example 9 and Comparative Example 3.

FIG. 6 is a C-V (capacity-voltage) graph of the nonaqueous-electrolytes of Experimental example 8, Experimental example 9 and Comparative Example 3. FIG. 7 shows cycle performance of the Li/MCMB batteries of Experimental example 8, Experimental example 9 and Comparative Example 3.

Referring to FIG. 6, comparing Experimental example 8 and Experimental example 9 with Comparative Example 3, the electric capacities of the nonaqueous-electrolytes of Experimental example 8 and Experimental example 9 were obviously higher than the electric capacity of Comparative Example 1. According to the above results, regarding the nonaqueous-electrolyte of the invention, the electric capacity of the nonaqueous-electrolyte after being treated by the voltage process may be increased.

Referring to FIG. 7, the Li/MCMB batteries containing the nonaqueous-electrolytes treated by the voltage process (Experimental example 8 and Experimental example 9) have preferable cycle performance than the Li/MCMB battery containing the nonaqueous-electrolyte not treated by the voltage process (Comparative Example 3).

Additionally, in comparison with the Li/MCMB battery containing the nonaqueous-electrolyte of Experimental example 8, the electric capacity of the Li/MCMB battery containing the nonaqueous-electrolyte of Experimental example 9 was obviously higher, which was in consistence with the nonaqueous-electrolyte of Experimental example 9 having a lower water volume.

Based on the above, in the invention, prior to injecting the nonaqueous-electrolyte into the containing region of the battery, the voltage process is first performed on the nonaqueous-electrolyte to remove impurities from the nonaqueous-electrolyte. Thereby, the stability of the nonaqueous-electrolyte can be effectively enhanced, and the electric capacity thereof can be increased, so as to improve the performance and stability of the battery containing the nonaqueous-electrolyte.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A treating method of a nonaqueous-electrolyte, suitable for being performed prior to injecting the nonaqueous-electrolyte into a containing region of a battery, the treating method of the nonaqueous-electrolyte comprising:
performing at least one first voltage process on the nonaqueous-electrolyte, wherein the first voltage process comprises:
applying a first voltage to the nonaqueous-electrolyte;
adjusting the voltage gradually from the first voltage to a second voltage; and
adjusting the voltage gradually from the second voltage to the first voltage.

2. The treating method of the nonaqueous-electrolyte according to claim 1, wherein the nonaqueous-electrolyte comprises a fluorine-containing electrolyte and an organic solvent.

3. The treating method of the nonaqueous-electrolyte according to claim 1, wherein the first voltage process comprises:
applying the first voltage to the nonaqueous-electrolyte;
gradually increasing the first voltage gradually to the second voltage; and
gradually reducing the second voltage to the first voltage,
wherein the first voltage is 0 V, and the second voltage is 3 V.

4. The treating method of the nonaqueous-electrolyte according to claim 1, wherein the first voltage process comprises:
applying the first voltage to the nonaqueous-electrolyte;
gradually reducing the first voltage to the second voltage; and
gradually increasing the second voltage to the first voltage,
wherein the first voltage is 3 V, and the second voltage is 0 V.

5. A method of fabricating a battery, comprising:
performing at least one first voltage process on a nonaqueous-electrolyte; and
injecting treated nonaqueous-electrolyte into a containing region of the battery,
wherein the first voltage process comprises:
applying a first voltage to the nonaqueous-electrolyte;
adjusting the voltage gradually from the first voltage to a second voltage; and
adjusting the voltage gradually from the second voltage to the first voltage.

6. The method of fabricating the battery according to claim 5, wherein the nonaqueous-electrolyte comprises a fluorine-containing electrolyte and an organic solvent.

7. The method of fabricating the battery according to claim 5, wherein in the first voltage process, the first voltage is first increased gradually to the second voltage, and then the voltage is reduced gradually from the second voltage to the first voltage,
wherein the first voltage is 0 V, and the second voltage is 3 V.

8. The method of fabricating the battery according to claim 5, wherein in the first voltage process is first reduced gradually to the second voltage, and then the voltage is increased gradually from the second voltage to the first voltage,
wherein the first voltage is 3 V, and the second voltage is 0 V.

* * * * *